United States Patent
Reece

(10) Patent No.: US 6,427,628 B1
(45) Date of Patent: Aug. 6, 2002

(54) TIMED CONTROL FEEDER FOR ANIMALS

(76) Inventor: James T. Reece, 782 Highway 30 East, Booneville, MS (US) 38829

( * ) Notice: Subject to any disclaimer, the term of this patent is extended or adjusted under 35 U.S.C. 154(b) by 39 days.

(21) Appl. No.: 09/668,578

(22) Filed: Sep. 25, 2000

(51) Int. Cl.$^7$ ................................................. A01K 1/10
(52) U.S. Cl. ................................................. 119/51.11
(58) Field of Search ............................ 119/51.11, 57.1

(56) References Cited

U.S. PATENT DOCUMENTS

| | | |
|---|---|---|
| 822,442 A | 6/1906 | Gamblin |
| 2,500,243 A | 3/1950 | Dixon ........................ 161/10 |
| 2,969,769 A | 1/1961 | Paschall ..................... 119/56 |
| 3,050,029 A | 8/1962 | Appleton ................. 119/51.13 |
| 3,762,373 A | 10/1973 | Grossman ................ 119/51.11 |
| 3,920,224 A * | 11/1975 | Fassauer ..................... 366/131 |
| 3,962,997 A * | 6/1976 | Ruth ....................... 119/51.11 |
| 4,183,327 A | 1/1980 | Olsen ...................... 119/51.11 |
| 4,279,220 A * | 7/1981 | Kukurba ................... 119/51.11 |
| 4,324,203 A * | 4/1982 | Chiappetti ................ 119/51.11 |
| 4,422,409 A | 12/1983 | Walker et al. ........... 119/51.11 |
| 4,665,862 A * | 5/1987 | Pitchford, Jr. ........... 119/51.11 |
| 4,922,857 A | 5/1990 | Arentoft .................. 119/51.12 |
| 5,078,097 A * | 1/1992 | Chisholm ................ 119/51.13 |
| 5,230,300 A * | 7/1993 | Mezhinsky .............. 119/51.11 |

* cited by examiner

Primary Examiner—Charles T. Jordan
Assistant Examiner—Jordan Lofdahl
(74) Attorney, Agent, or Firm—Walker, McKenzie & Walker, P.C.

(57) ABSTRACT

An apparatus for storing and automatically dispensing a desired quantity of animal feed onto a feed dish. The apparatus includes a hopper for storing a quantity of animal feed; a receptacle for receiving animal feed from the hopper; an impeller positioned adjacent the face surface of the receptacle; a motor for rotating the impeller when activated to cause the impeller to sweep animal feed from the face surface of the receptacle; a switch for activating and deactivating the motor; a timer mechanism for causing the switch to activate the motor after a set period of time has elapsed; and a control mechanism for causing the switch to deactivate the motor after the impeller has rotated a pre-set amount.

7 Claims, 4 Drawing Sheets

TIMED CONTROL FEEDER FOR ANIMALS

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to animal feeders and, more specifically, to time controlled animal feeder for storing and automatically dispensing a desired quantity of food.

2. Information Disclosure Statement

A preliminary patentability search conducted in Class 119, subclasses 51.11, 56.1 and 57.5, produced the following patents which appear to be relevant to the present invention:

Artentoft, U.S. Pat. No. 4,922,857 (issued May 8, 1990), shows a ganged plurality of feeders in which each feeder has disk (22) having a plurality of wedge-shaped notches that move feed from an opening in a top plate (18) around to an opening in a bottom plate (26) to a dispenser below.

Walker et al., U.S. Pat. No. 4,422,409 (issued Dec. 27, 1983), shows a motor-driven turntable or carousel having a plurality of compartments therein that are loaded from a hopper. A timer turns the motor on and a switch causes the device to turn off after a feeding sequence has completed.

Kukurba, U.S. Pat. No. 4,279,220 (issued Jul. 21, 1981), shows a plurality of wipers that dispense food. A motor turns the wipers, and a timer sequences the motor on and off.

Olsen, U.S. Pat. No. 4,183,327 (issued Jan. 15, 1980), shows a rotating wiper that dispenses food from a top opening (52) to a bottom opening (56). A timer actuates the motor that drives the feeder.

Grossman, U.S. Pat. No. 3,762,373 (issued Oct. 2, 1973) discloses a pair of rotating discs that cooperate to dispense food. A timer and motor operate the apparatus.

Appleton, U.S. Pat. No. 3,050,029 (issued Aug. 21, 1962), discloses a rotating carousel having a number of compartments that dispense food from an upper opening to a lower opening. A motor and timer operate the unit.

Paschall, U.S. Pat. No. 2,969,769 (issued Jan. 3, 1961), discloses a manual feeder that dispenses a fixed amount of food at each cycle.

Dixon, U.S. Pat. No. 2,500,243 (issued Mar. 14, 1950), shows a rotating member having a plurality of compartments that dispense the food. An electric motor drives the rotating member.

Gamblin, U.S. Pat. No. 822,442 (issued Jun. 5, 1906) shows rotating wipers that move food from an upper opening to a lower opening.

Nothing in the known prior art discloses or suggests the present invention. More specifically, nothing in the known prior art discloses or suggests an apparatus for storing and automatically dispensing a desired quantity of animal feed onto a feed dish, including a hopper for storing a quantity of animal feed; a receptacle or receiving animal feed from the hopper; an impeller positioned adjacent the face surface of the receptacle; a motor for rotating the impeller when activated to cause the impeller to sweep animal feed from the face surface of the receptacle; a switch for activating and deactivating the motor; timer means for causing the switch to activate the motor after a set period of time has elapsed; and control means for causing the switch to deactivate the motor after the impeller has rotated a pre-set amount.

BRIEF SUMMARY OF THE INVENTION

The present invention provides an apparatus for storing and automatically dispensing a desired quantity of animal feed onto a feed dish.

The apparatus of the present invention includes, in general, a hopper for storing a quantity of animal feed; a receptacle for receiving animal feed from the hopper; an impeller positioned adjacent the face surface of the receptacle; a motor for rotating the impeller when activated to cause the impeller to sweep animal feed from the face surface of the receptacle; a switch for activating and deactivating the motor; timer means for causing the switch to activate the motor after a set period of time has elapsed; and control means for causing the switch to deactivate the motor after the impeller has rotated a pre-set amount.

DETAILED DESCRIPTION OF THE INVENTION

Figure 1:
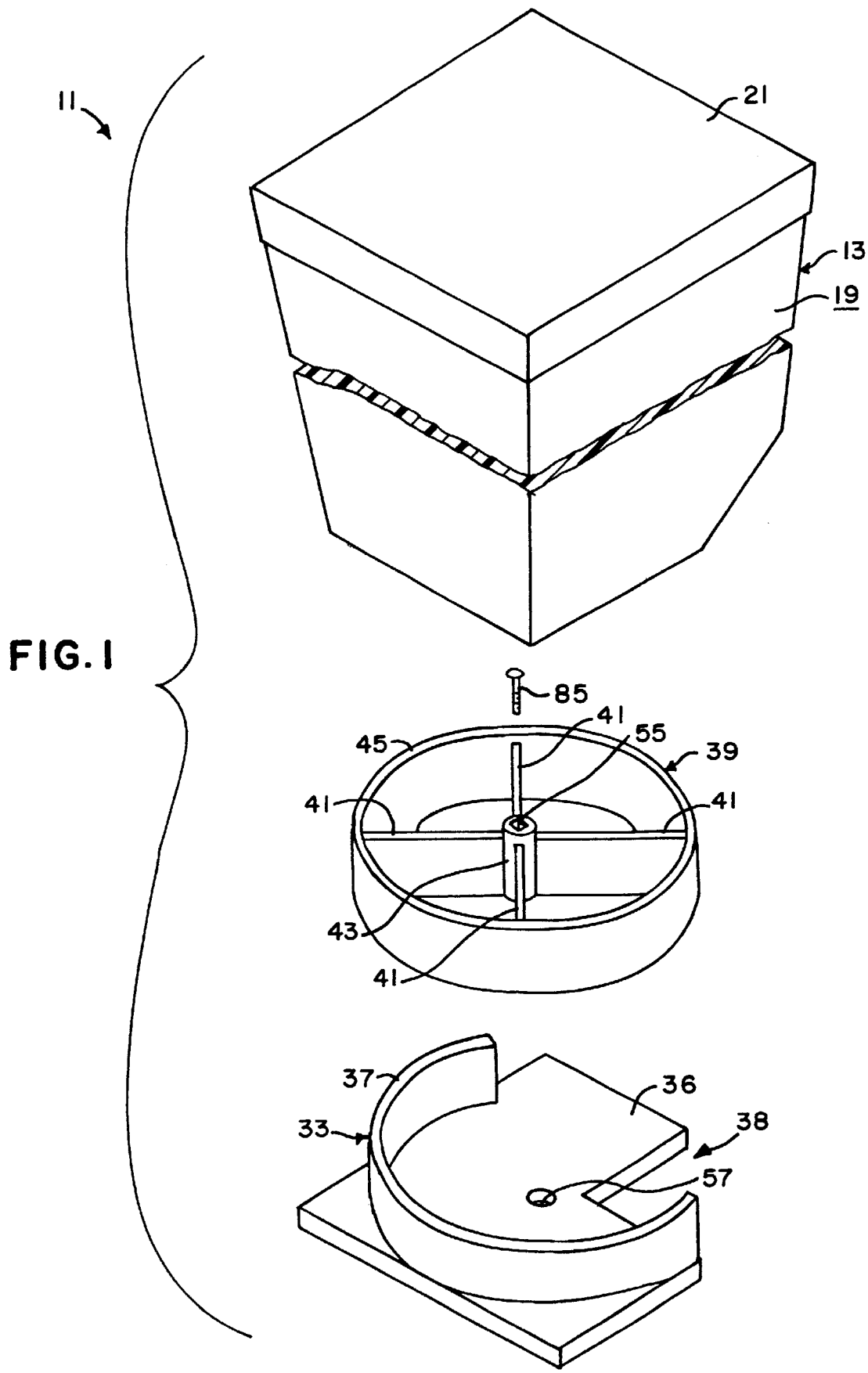
FIG. 1 is an exploded perspective view of a first group of elements of the apparatus of the present invention.

A preferred embodiment of the apparatus of the present invention is shown in the drawings and identified by the numeral 11. The apparatus 11 is specifically designed and constructed for storing and automatically dispensing a desired quantity of animal feed F onto a feed dish D. While the preferred embodiment of the apparatus 11 as disclosed herein is specifically designed for standard dry feed, the apparatus 11 could also be used for wet feed, etc., with or without modification.

The apparatus 11 includes a hopper 13 having an interior cavity 15 for storing a quantity of animal feed F and having an outlet port 17 communicating with the interior cavity 15 for allowing animal feed F to exit the interior cavity 15. The hopper 13 preferably consists of an opened-top, funnel-shaped bin 19 for temporarily storing loose animal feed F with the outlet port 17 located at the bottom thereof so that the animal feed F will fall from the interior cavity 15 through the outlet port 17 by gravity, and a top or lid 21 for selectively closing the opened-top of the bin 19. The bottom 23 of the bin 19 is preferably designed so that the outlet port 17 extends therethrough in one quadrant thereof (rather than through the center thereof) for reasons which will hereinafter become apparent.

The apparatus 11 includes a base 25 having a bottom 27 for resting on the ground or other support surface (e.g., the floor of a building), and side walls 29 extending upward from the bottom 27. One side wall 29 or corner of the base 25 preferably has an opening 31 therethrough for allowing a portion of the feed dish D to extend therethrough for receiving feed F from the hopper 13. For example, the feed dish D may include a tongue T for extending through the opening 31 into the interior of the base 25 to catch feed F dropping through the outlet port 17 of the hopper 13 in a manner as will hereinafter become apparent. The tongue T is preferably angled to cause feed F caught thereon to slide out the opening 31 into the body of the feed dish D.

The apparatus 11 includes a receptacle 33 having a face surface 35 for receiving animal feed from the outlet port 17 of the hopper 13. The receptacle 33 may consist of a tray having a flat, generally square shaped bottom 36 and an generally circular wall 37 extending upward from the face surface 35, with an approximately one quadrant pie-shaped opened segment 38 omitted or cut away as clearly shown in FIG. 1.

Figure 2:
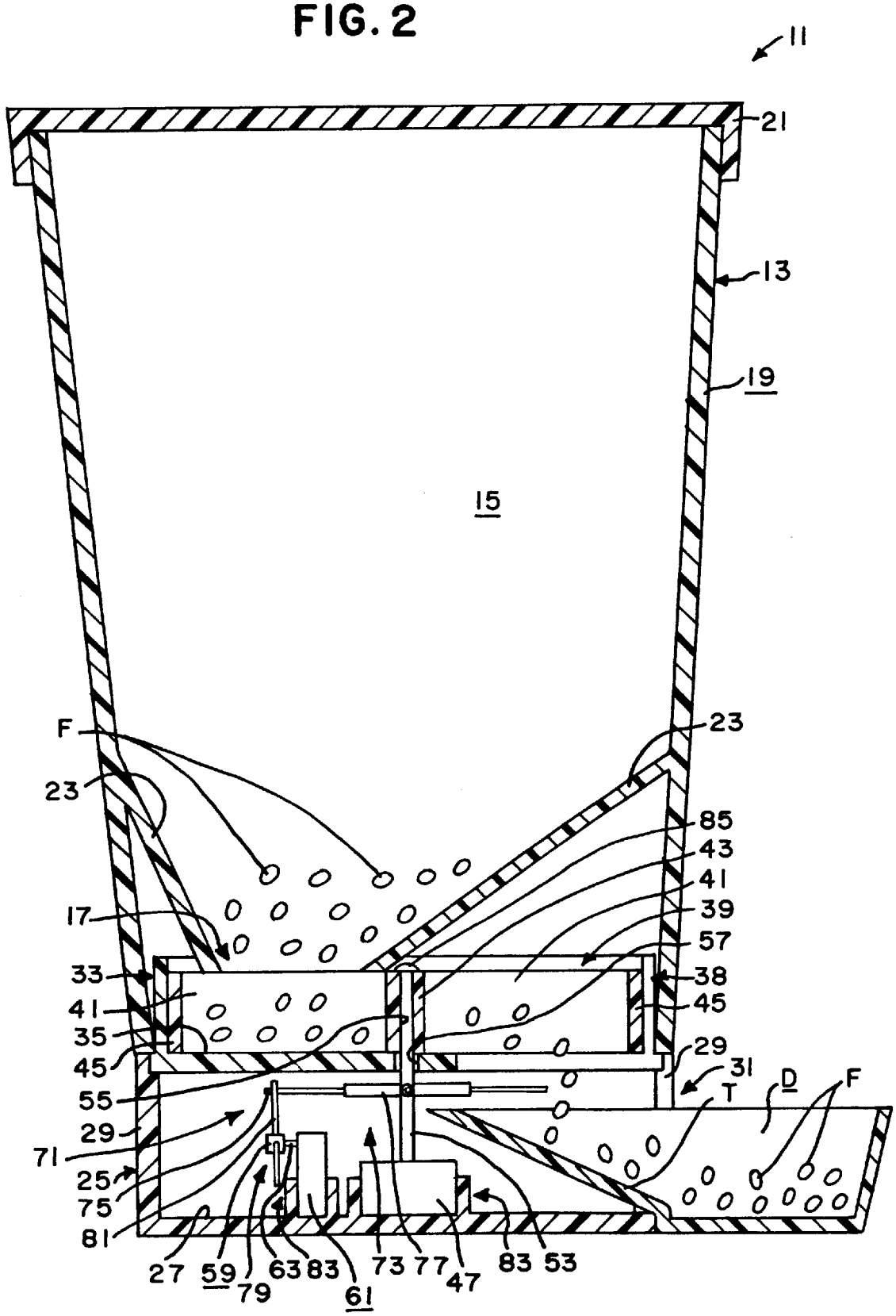
FIG. 2 is a somewhat diagrammatic sectional view of the apparatus of the present invention, shown dispensing a quantity of animal feed onto a feed dish.
Figure 3:
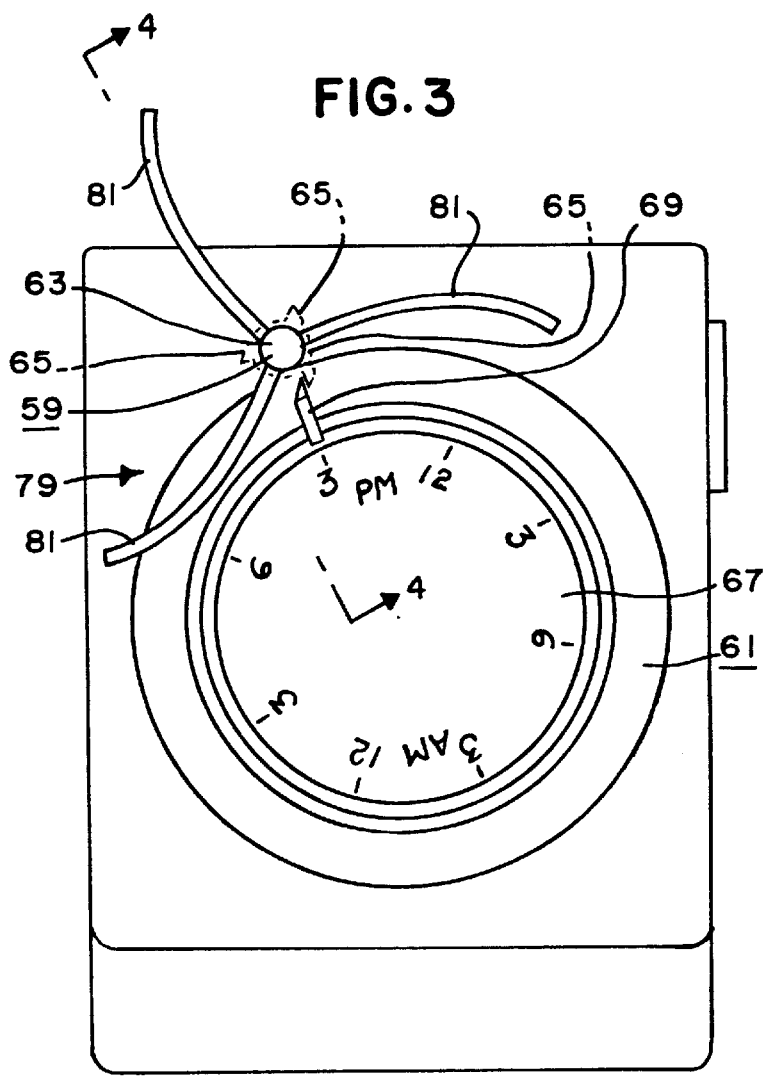
FIG. 3 is a front elevational view of a switch, timer and control construct of the apparatus of the present invention.
Figure 4:
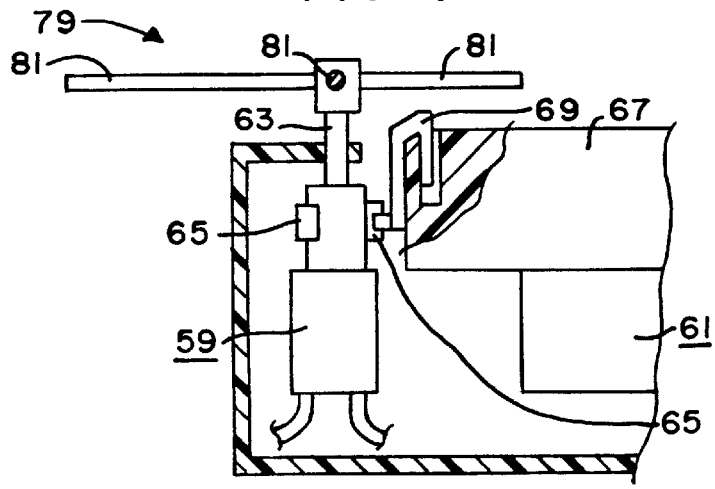
FIG. 4 is a sectional view substantially as taken on line 4—4 of FIG. 3.

The hopper 13, base 25 and receptacle 33 are preferably designed and sized so that the bottom 36 of the receptacle 33 will fit within the top of the base 25 so that the receptacle 33 is non-rotatably supported on the base 25, and so that the bottom 23 of the bin 19 of the hopper 13 will fit over the wall 37 of the receptacle 33 as clearly shown in FIG. 2.

The apparatus 11 includes an impeller 39 having at least one arm member 41 positioned adjacent the face surface 35 of the receptacle 33 (at least two arm members 41 are required to accurately control the amount of animal feed F being dispensed). The impeller 39 preferably has a rotary hub 43 and four arm members 41 extending radially outward from the rotary hub 43 and spaced substantially 90° from one another as clearly shown in FIG. 1. A circular outer wall 45 may join the outer ends of each arm member 43. The impeller 39 is designed to rotatably fit within the upturned side edge of the receptacle 33 with the arm members 41 designed to wipe or sweep the face surface 35 of the receptacle 33 so that any animal feed F on the face surface 35 of the receptacle 33 will be swept through the open segment 38 of the face surface 33 by the arm members 41 when the impeller 39 rotates.

The apparatus 11 includes a motor 47 for rotating the impeller 39 when activated to cause the arm member or members 41 of the impeller 39 to sweep animal feed F from the face surface 35 of the receptacle 33 to the feed dish F. The motor 47 may be of any type that can be connected to the impeller 39 in such a manner as to cause the impeller 39 to rotate. Thus, for example, the motor 47 may consist of a typical electric motor having a drive or motor shaft 49 for being attached to the rotary hub 43 of the impeller 39 so that the impeller will rotate when an electrical power circuit is completed to the motor 47, thereby engaging or activating the motor 47 and causing the motor shaft 49 to rotate. The motor 47 is preferably designed to slowly rotate the motor shaft 49, by way of a gear drive or the like. A suitable off-the shelf electric motor would be a well-known rotisserie drive motor. While the motor shaft 49 could extend directly from the motor 47 to the rotary hub 43 of the impeller 39, a rotisserie drive motor typically has a motor shaft 49 that does not extend past the body of the motor and that has an aperture 51 therein with a square shaped cross sectional area for drivably receiving one end of an elongated drive rod 53 having a corresponding square shaped cross sectional area. The rotary hub 43 of the impeller 39 also preferably has an aperture 55 therein for drivably receiving the opposite end of the drive rod 53 so that rotation of the motor shaft 49 will cause the drive rod 53 to rotate and, in turn, cause the impeller 39 to rotate. The face surface 35 of the receptacle 33 preferably has an aperture 57 therein for allowing the impeller 39 to freely pass therethrough, without causing the receptacle 33 to rotate, etc.

The apparatus 11 includes a switch 59 having an on position for activating the motor 47 and having an off position for deactivating the motor 47, and a timer means 61 for moving the switch 59 to the on position at a desired time or after a set period of time has elapsed. The specific construction, design and operation of the switch 59 and timer means 61 may vary as will now be apparent to those skilled in the art. When the motor 47 consists of a typical electric motor as indicated above, the switch 59 and timer means 61 are preferably coupled to the electrical power circuit used to electrically energizing the motor 47. In such a case, the switch 59 and timer means 61 may consist of an off-the-shelf appliance timer such as the Model TB111c table top appliance timer marketed by Intermatic Inc., Intermatic Plaza, Spring Grove, Ill. 60081-9698. In such an appliance timer, the switch 59 is a continuous-rotation rotary latching switch having a rotary on-off shaft 63, and a plurality of fingers 65 extend radially outward of the rotary on-off shaft 63. The timer means 61 in such an appliance timer has a rotating clock face 67 including time indicia thereon. One or more on-trippers 69 can be attached to the rotating clock face 67 in positions to engage one of the fingers 65 cause to rotary on-off shaft 63 to rotate, thereby turning the switch 59 on at a desired time. For purposes of the present invention, when using a typical 24 hour timer and when desired to dispense a desired quantity of food F to the feed dish D only once each day, only one such on-tripper 69 need be used with that one on-tripper 69 positioned on the rotating clock face 67 at the location representing the desired time of day to dispense food F to the feed dish D as will now be apparent to those skilled in the art. If it is desired to dispense food F more than once a day, one or more additional on-trippers 69 can be positioned on the rotating clock face 67 at the location representing the subsequent desired time or times of day to dispense food F to the feed dish D. While such appliance timers typically include one or more off-trippers for turning the switch 59 off a certain period of time after an on-tipper 69 had turned on the switch 59, with the present invention, on off-trippers are required.

Figure 1A:
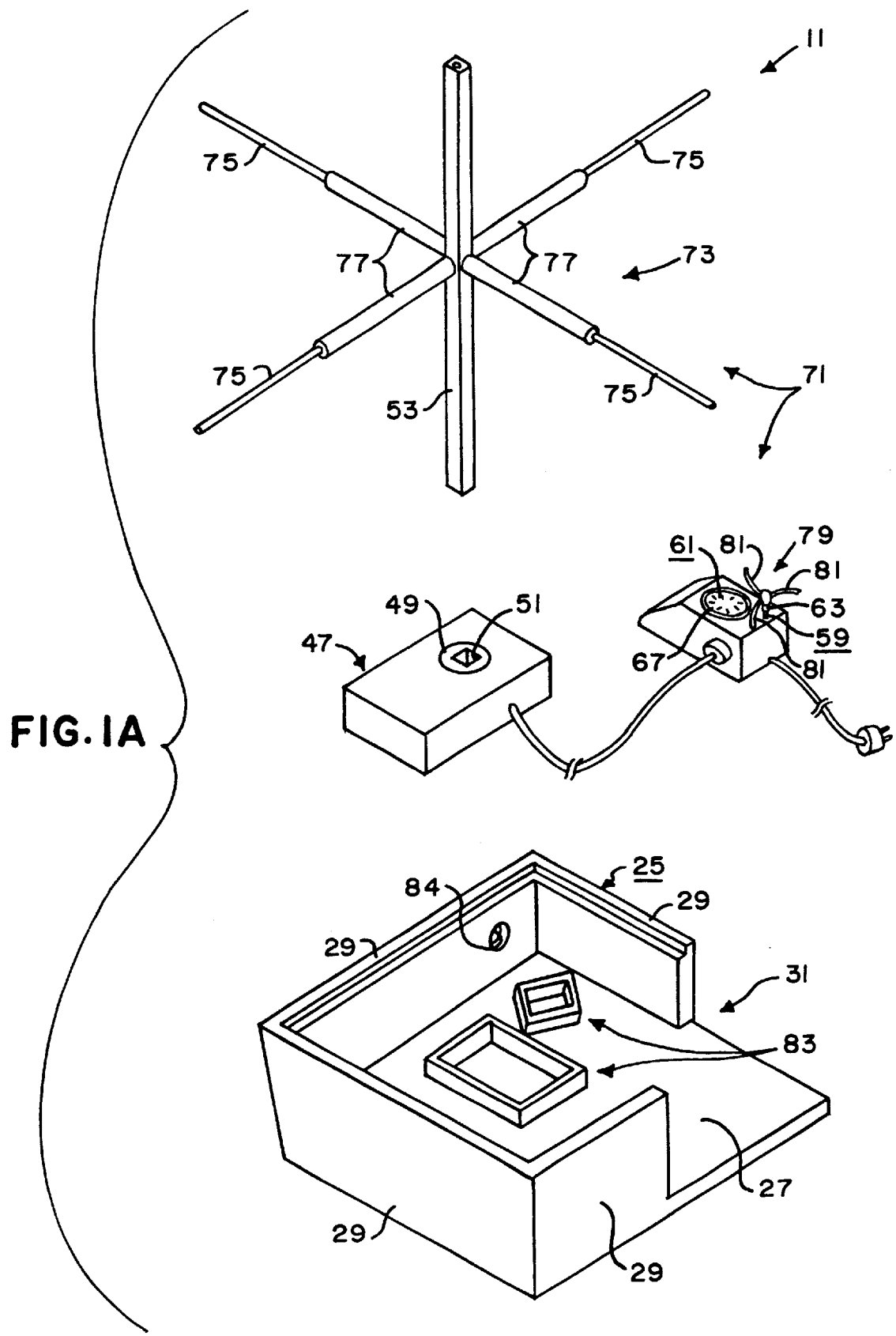
FIG. 1A is an exploded perspective view of a second group of elements of the apparatus of the present invention, and is a continuation from the lower end of FIG. 1.

The apparatus 11 includes control means 71 for moving the switch 59 to the off position after the impeller 39 has rotated a pre-set amount. For example, the control means 71 is preferably designed to deactivate the switch 59 after the impeller 39 has rotated 90°. The control means 71 preferably includes trigger means 73 coupled to the impeller 39 for rotating with the impeller 39 for triggering some event to move the switch 59 to the off position after the impeller 39 has rotated a pre-set amount to deactivate the switch 39. The trigger means 73 may include at least one, and preferably a plurality of, elongated finger-like trigger members 75 (at least two trigger members 75 are necessary to accurately control the amount of animal feed F being dispensed) attached to and extending radially outward from the drive rod 53, and, thus, coupled to the rotary hub 43 of the impeller 39 via the drive rod 53. As clearly shown in FIG. 1A, the trigger means 73 preferably includes four trigger members 75 attached to and extending radially outward from the drive rod 53 with each of the trigger members 75 being spaced 90° from one another so that one of the trigger members 75 will trigger some event to move the switch 59 to the off position after the impeller 39 has rotated to deactivate the switch has rotated 90°. The actual number of trigger members 75 should equal the actual number of arm members 41 of the impeller 39, and vice versa. The trigger means 73 is preferably designed so that the angle between adjacent trigger members 75 can be varied. For example, the trigger means 73 may be designed so that at least one of the trigger members 75 can be removed from the drive rod 53 to allow the degree of rotation of the impeller 39 before one of the trigger members 75 will trigger some event to move the switch 59 to the off position to be varied. However, as indicated above, at least two trigger members 75 are necessary to accurately control the amount of animal feed F being dispensed and the angle between each trigger member should be equal (e.g., 180° when only two trigger members 75 are used, 90° when four trigger members 75 are used, 45° when eight trigger members 75 are used, etc.) The trigger means 73 may include hub members 77 attached to the drive rod 53 and the trigger members 75 may be adapted to being removably screwed into the hub members 77.

The control means 71 may include various means for being triggered by movement of the trigger members 75 to move the switch 59 to the off position. For example, the control means 71 may include an infrared photorelay sensor and associated solenoid or the like arranged so that when one of the trigger members 75 moves sufficiently to break the beam projected by the sensor, the solenoid or the like will move the switch 59 to the off position as will now be apparent to those skilled in the art. Preferably, however, the control means 71 includes control arm means 79 coupled to the switch 59 for being engaged by the trigger means 73 to deactivate the switch 59 after the impeller 39 has rotated a pre-set amount (e.g., 90°). The control arm means 79 may include a plurality of elongated control arm members 81 attached to and extending radially outward from the rotary on-off shaft 63 of the switch 59 so that the switch 59 can be turned off by merely pivoting one of the control arm members 81 about the longitudinal axis of the rotary on-off shaft 63. The control arm means 79 preferably includes three elongated control arm members 81 attached to and extending radially outward from the rotary on-off shaft 63 of the switch 59 with each of the control arm members 81 being spaced 120° from one another. The required number of control arm members 81 will depend on the actual design of the switch 59 (e.g., on how many on-off positions the switch 59 during one complete revolution of the rotary on-off shaft 63 thereof), etc.

The apparatus 11 may be constructed in various manners, out of various materials, and in various shapes and sizes as will now be apparent to those skilled in the art. Thus, for example, the hopper 13, base 25, receptacle 33, and impeller 39, along with the feed dish D, can be molded or otherwise constructed out plastic or the like. While the feed dish D and base 25 can be molded or otherwise constructed as an integral, one-piece unit, the feed dish D is preferably separate and removable from the base 25 to allow quick and easy access to the timer means 61 and control means 71 so that the timing and amount of animal feed F to be dispensed can be quickly and easily varied. As indicated hereinabove, the motor 47 may be standard, off-the-shelf electric rotisserie drive motor, while the basic switch 59 and timer means 61 may be a standard, off-the-shelf appliance timer having a rotary on-off switch modified to include the control arm means 79, etc. The drive rod 53 may consist of an elongated metal rod or the like having a cross sectional area adapted to be drivably engaged by the motor shaft 49 and to drivably engage the rotary hub 43 of the impeller 39. The base 25 is designed to securely hold and position the motor 47 and combined switch 59 and timer means 61 construct in such a position so that the trigger members 75 will contact and rotate the control arm members 81. Thus, the base 25 preferably includes positioning structure 83 on the bottom 27 thereof for receiving and properly positioning the motor 47 and the appliance timer that forms the switch 59 and timer means 61. Such positioning structure 83 may be indents sized to securely receive the bottom of the motor 47 and the appliance timer that forms the switch 59 and timer means 61 formed either on the bottom 27 of the base 25 or formed by walls, pegs or the like extending upward from the bottom 27 of the base 25 (see FIG. 1A). The base 25 may have an aperture 84 for allowing an electrical cord from the appliance timer that forms the switch 59 and timer means 61 to extend therethrough. A screw 85 or the like may be provided for securing attaching the impeller 39 to the drive rod 53.

The operation of the apparatus 11 should now be apparent to those skilled in the art. The interior cavity 15 of the hopper 13 is filled with a quantity of animal feed F, and gravity will cause a portion of such animal feed F to pass through the outlet port 17 onto the face surface 35 of the receptacle 33. The timer means 61 is set to move the switch 59 to the on position at a desired time by, for example, placing an on-tripper 69 at the location relative to the rotating clock face 67 that corresponds to that desired time, etc. Except for the omission of off-trippers, the basic construction and operation of the off-the-shelf appliance timer for use in the present invention is not changed and will now be apparent to those skilled in the art. When that set time arrives, the switch 59 will be closed (moved to the on position), and the motor 47 activated to cause the impeller 39 to rotate and sweep animal feed F from the face surface 35 of the receptacle 33, through the open segment 38 of the face surface 35, into the feed dish D. After the impeller 39 has rotated a pre-set amount (e.g., 90°), the control means 71 will move the switch 59 to the off position (e.g., one of the trigger members 75 will engage and rotate one of the control arm members 81 to move the switch 59 to the off position). The timer means 61 will continue running and will subsequently move the switch 59 back to the on position at a another desired time (e.g., if another on-tripper 69 is used to set a different time) or at the same time on the following day, etc., as will now be apparent to those skilled in the art.

Although the present invention has been described and illustrated with respect to a preferred embodiment and a preferred use therefor, it is not to be so limited since modifications and changes can be made therein which are within the full intended scope of the invention.

What is claimed is:

1. An apparatus for storing and automatically dispensing a desired quantity of animal feed onto a feed dish; said apparatus comprising:

(a) a hopper having an interior cavity for storing a quantity of animal feed and having an outlet port communicating with said interior cavity for allowing animal feed to exit said interior cavity;

(b) a receptacle having a face surface for receiving animal feed from said outlet port of said hopper;

(c) an impeller including at least one arm member positioned adjacent said face surface of said receptacle;

(d) a motor for rotating said impeller when activated to cause said arm member of said impeller to sweep animal feed from said face surface of said receptacle to the feed dish;

(e) a switch having an on position for activating said motor and having an off position for deactivating said motor;

(f) timer means for causing said switch to activate said motor after a set period of time has elapsed; and (g) control means for causing said switch to deactivate said motor after said impeller has rotated a pre-set amount; said control means including trigger means coupled to said impeller for rotating with said impeller for triggering some event to deactivate said switch after said impeller has rotated a pre-set amount.

2. The apparatus of claim 1 in which said control means includes control arm means coupled to said switch for being engaged by said trigger means to deactivate said switch after said impeller has rotated a pre-set amount.

3. The apparatus of claim 2 in which said switch has a rotary on-off shaft; and in which said control arm means includes a plurality of control arm members extending radially outward from said rotary on-off shaft of said switch.

4. The apparatus of claim 3 in which said impeller has a rotary hub; and in which said trigger means includes a plurality of trigger members attached to and extending radially outward from said rotary hub of said impeller for movably engaging one of said control arm members of said control arm means to deactivate said switch.

5. The apparatus of claim 3 in which said impeller has a rotary hub; and in which said trigger means includes four trigger members attached to and extending radially outward from said rotary hub of said impeller; each of said trigger members being spaced 90° from one another so that one of said trigger members will engage one of said control arm members of said control arm means to deactivate said switch after said impeller has rotated 90°.

6. The apparatus of claim 5 in which at least one of said trigger members can be removed from said rotary hub of said impeller to allow the degree of rotation of said impeller before one of said trigger members will engage one of said control arm members of said control arm means to deactivate said switch to be varied.

7. An apparatus for storing and automatically dispensing a desired quantity of animal feed onto a feed dish; said apparatus comprising:

(a) a hopper having an interior cavity for storing a quantity of animal feed and having an outlet port communicating with said interior cavity for allowing animal feed to exit said interior cavity;

(b) a receptacle having a face surface for receiving animal feed from said outlet port of said hopper and having an outlet port for allowing animal feed to pass from said face surface of said tray to the feed dish;

(c) an impeller including at least one arm member positioned adjacent said face surface of said receptacle; said impeller having a rotary hub;

(d) an electric motor for rotating said impeller when electrically energized to cause said arm member of said impeller to sweep animal feed from said face surface of said receptacle through said outlet port of said receptacle;

(e) a switch having an on position for completing an electrical power circuit to said electric motor to thereby electrically energize said electric motor and having an off position for breaking the electrical power circuit to said electric motor; said switch having a rotary shaft;

(f) timer means for moving said switch to said on position after a set period of time has elapsed; and (g) control means for moving said switch to said off position after said impeller has rotated a pre-set amount; said control means including control arm means coupled to said switch; and trigger means coupled to said impeller for rotating with said impeller for engaging said control arm means after said impeller has rotated a pre-set amount to move said switch to said off position; said control arm means including a plurality of control arm members extending radially outward from said rotary on-off shaft of said switch; said trigger means including a plurality of trigger members attached to and extending radially outward from said rotary hub of said impeller for movably engaging one of said control arm members of said control arm means to move said switch to said off position; at least one of said trigger members being removable from said rotary hub of said impeller to allow the degree of rotation of said impeller before one of said trigger members will engage one of said control arm members of said control arm means to move said switch to said off position to be varied.

* * * * *